(12) United States Patent
Ord et al.

(10) Patent No.: US 10,920,732 B1
(45) Date of Patent: Feb. 16, 2021

(54) METHODS AND SYSTEMS FOR ENGINE START FOLLOWING IDLE-STOP

(71) Applicant: Ford Global Technologies, LLC, Dearborn, MI (US)

(72) Inventors: David Andrew Ord, Woodhaven, MI (US); Brad Alan VanDerWege, Plymouth, MI (US); Jeffrey Allen Doering, Canton, MI (US); Joseph Lyle Thomas, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/783,857

(22) Filed: Feb. 6, 2020

(51) Int. Cl.
*F02N 11/08* (2006.01)

(52) U.S. Cl.
CPC ............................. *F02N 11/0818* (2013.01)

(58) Field of Classification Search
CPC ............. F02N 11/0818; F02N 11/0814; F02N 11/0803; F02N 19/005
See application file for complete search history.

(56) References Cited

U.S. PATENT DOCUMENTS

| | | | |
|---|---|---|---|
| 7,011,063 B2 * | 3/2006 | Condemine | ........... F02N 99/006 123/179.4 |
| 7,624,712 B1 | 12/2009 | Pursifull | |
| 2010/0000487 A1 * | 1/2010 | Hoshino | ................. F02N 11/00 123/179.4 |
| 2013/0080036 A1 * | 3/2013 | Yamauchi | ............. F02D 41/065 701/112 |

* cited by examiner

*Primary Examiner* — Xiao En Mo
(74) *Attorney, Agent, or Firm* — Geoffrey Brumbaugh McCoy Russell LLP

(57) ABSTRACT

Methods and systems are provided for restarting an engine following an engine idle-stop. In one example, a method may include upon receiving an engine restart request during an engine idle-stop, initiating combustion in a selected cylinder and based on a predicted time of attainment of peak pressure in the cylinder, activating a starter motor.

19 Claims, 6 Drawing Sheets

METHODS AND SYSTEMS FOR ENGINE START FOLLOWING IDLE-STOP

FIELD

The present description relates generally to methods and systems for restarting an engine following an engine idle-stop.

BACKGROUND/SUMMARY

During intermediate vehicle stops such as at a traffic light, an engine may idle for some time. In order to increase fuel efficiency and improve emissions quality, the vehicle engine may be equipped with a start-stop function (also referred herein as idle-stop) to reduce prolonged idling by temporarily shutting down the engine and then restarting the engine when restart conditions are met. In hybrid vehicles, upon conditions being met for propelling the vehicle via motor torque, the engine may be idle-stopped. Following each idle-stop, upon conditions for engine restart being met, the engine may be cranked via a starter motor or a belt-integrated starter generator (BISG).

Various approaches are provided for restarting an engine following an idle-stop. In one example, as shown in U.S. Pat. No. 7,011,063, Condemine et al. teaches, upon indication of an engine idle-stop, adjusting fueling and spark to stop the engine at a pre-determined position. Prior to engine shut-down, fuel is injected to a cylinder to be stopped in compression position. Upon receiving an engine restart request, while engaging a starter motor, ignition is carried out in the cylinder injected with fuel to combust the fuel and facilitate engine rotation.

However, the inventors herein have recognized potential issues with such systems. As one example, engaging the starter motor along with combustion in a cylinder may cause the piston head of the engine to move before the combustion event reaches its peak and consequently energy generated from the combustion may not be completely utilized to improve efficiency of the starting event. Also, during certain operating condition, stopping the engine at a desired position may not be feasible and the cylinder to which fuel is injected without ignition may not be parked in the desired position, thereby decreasing the impact of the combustion in that cylinder on engine start. A hybrid vehicle may be started up to one million times over its lifetime which may adversely affect the hardware used for starting the engine such as a starter motor or a BISG.

In one example, the issues described above may be addressed by a method comprising: method for an engine, comprising: prior to a first engine restart following an idle-stop, initiating combustion in a selected cylinder, and at a threshold pressure in the selected cylinder, engaging a starter device to crank the engine. In this way, by coordinating engagement of a starter device with an attainment of peak pressure in a cylinder, efficiency of the starting event may be improved.

As one example, in response to idle-stop conditions being met (such as in response to a longer than threshold duration of engine idling), an engine idle-stop may be initiated and engine combustion may be suspended. A cylinder stopped in an expansion (power) stroke may be identified and a volume of the cylinder may be estimated. Upon indication of a subsequent engine restart, fuel may be injected to the identified cylinder and spark may be initiated. Air fuel ratio (AFR) in the cylinder may be estimated as a function of the cylinder position, engine temperature, barometric pressure, etc. A time based burn fraction indicating an amount of time taken during combustion to convert fuel to energy may be estimated based on the cylinder position, engine temperature, barometric pressure, AFR, etc. A time for attainment of peak pressure corresponding to the highest energy release from combustion may be estimated based on the time based burn fraction. An engagement of a starter device such as a starter motor or a BISG may be coordinated with the time of attainment of the peak pressure. The command from the controller to activate the starter device is transmitted immediately before peak pressure is obtained. Following the engagement of the starter device, combustion may be initiated in all engine cylinders and engine cranking via the starter device may be continued until a threshold engine speed is reached.

In this way, by synchronizing highest energy release from combustion carried out in one cylinder and engagement of a starter device, maximum torque assistance from combustion may be utilized. By coordinating multiple torque sources, efficiency of an engine start may be improved. By sending the command for activating the starter device immediately before peak pressure is attained, piston movement via the starter device and due to combustion may be synchronized. The technical effect of carrying our combustion in one selected cylinder immediately before engine cranking is that work done by the starter device to crank an engine may be decreased, thereby decreasing wear in the starter device hardware. Overall, by improving efficiency of an engine start event, emissions quality, operator satisfaction, and hardware health may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
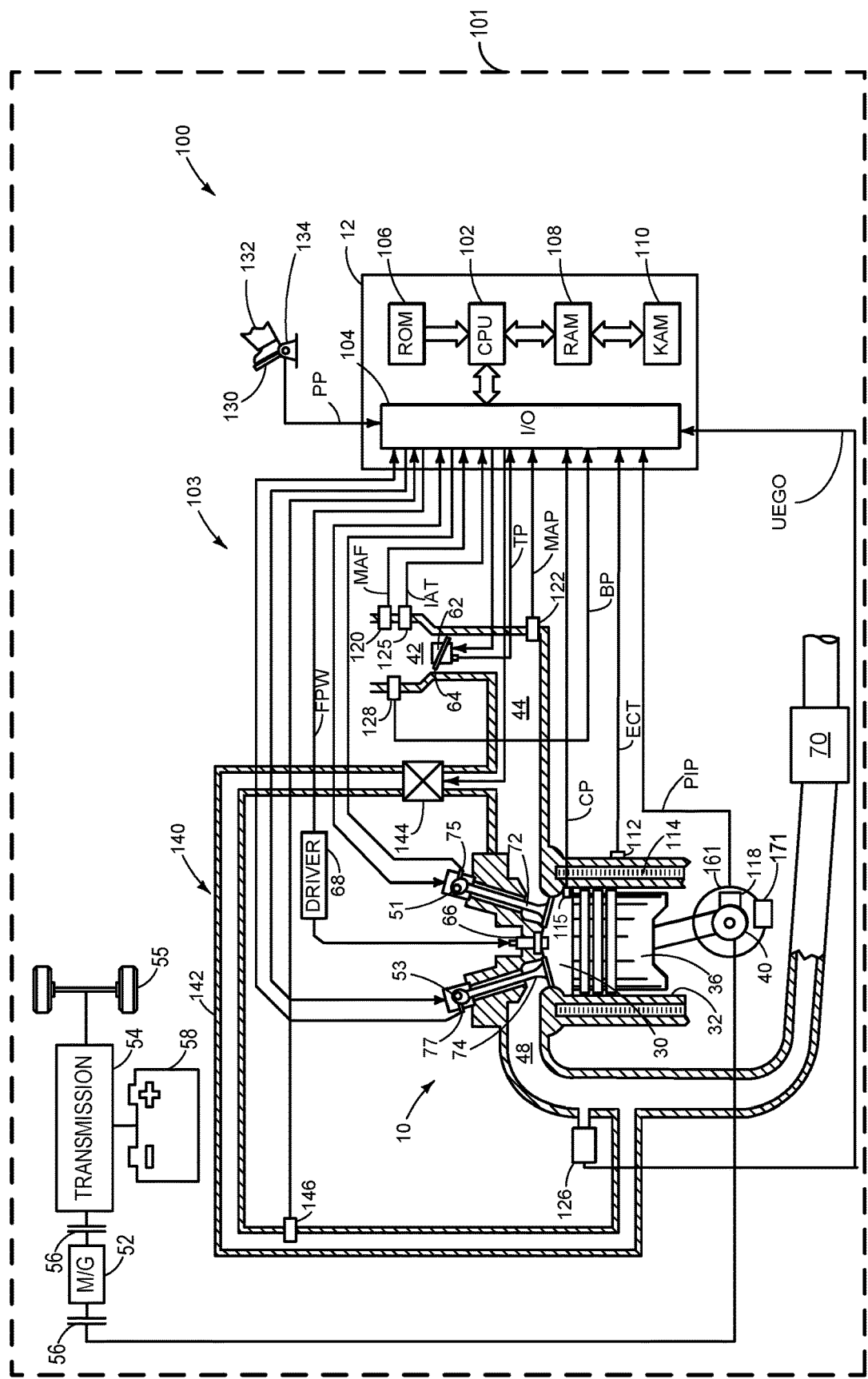
FIG. 1 shows an example engine system coupled to a hybrid vehicle.
Figure 3:
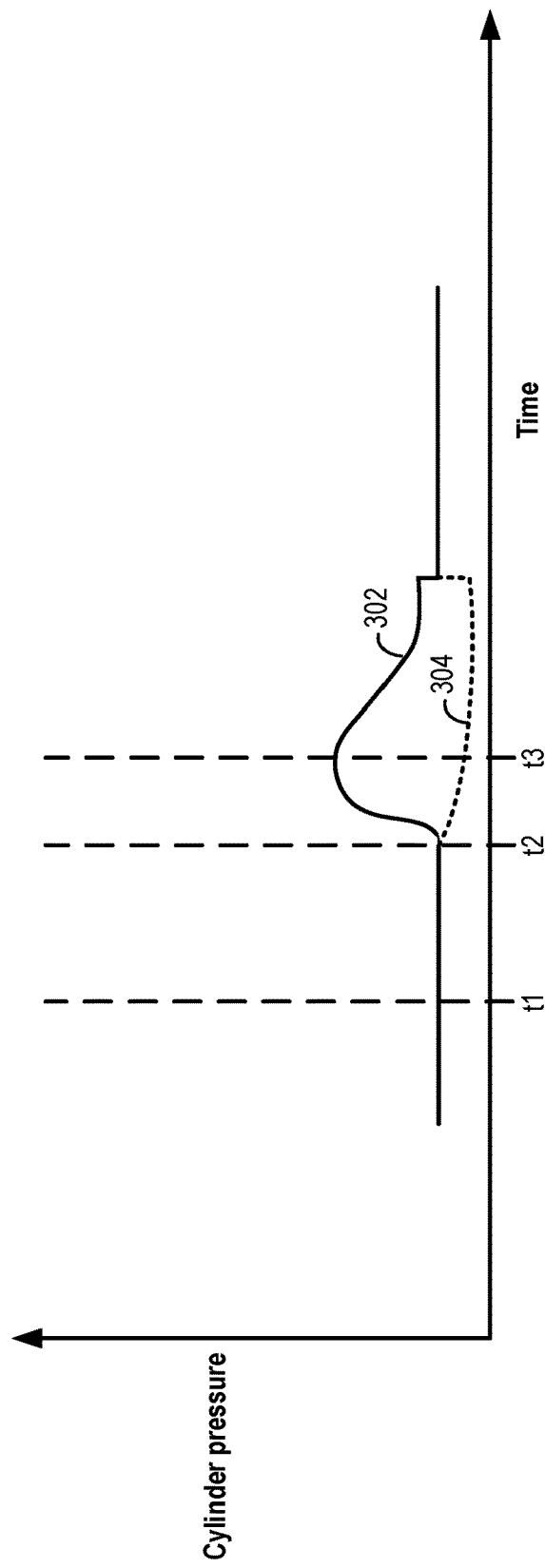
FIG. 3 shows a first example timeline of starter device engagement during the engine restart.
Figure 4:
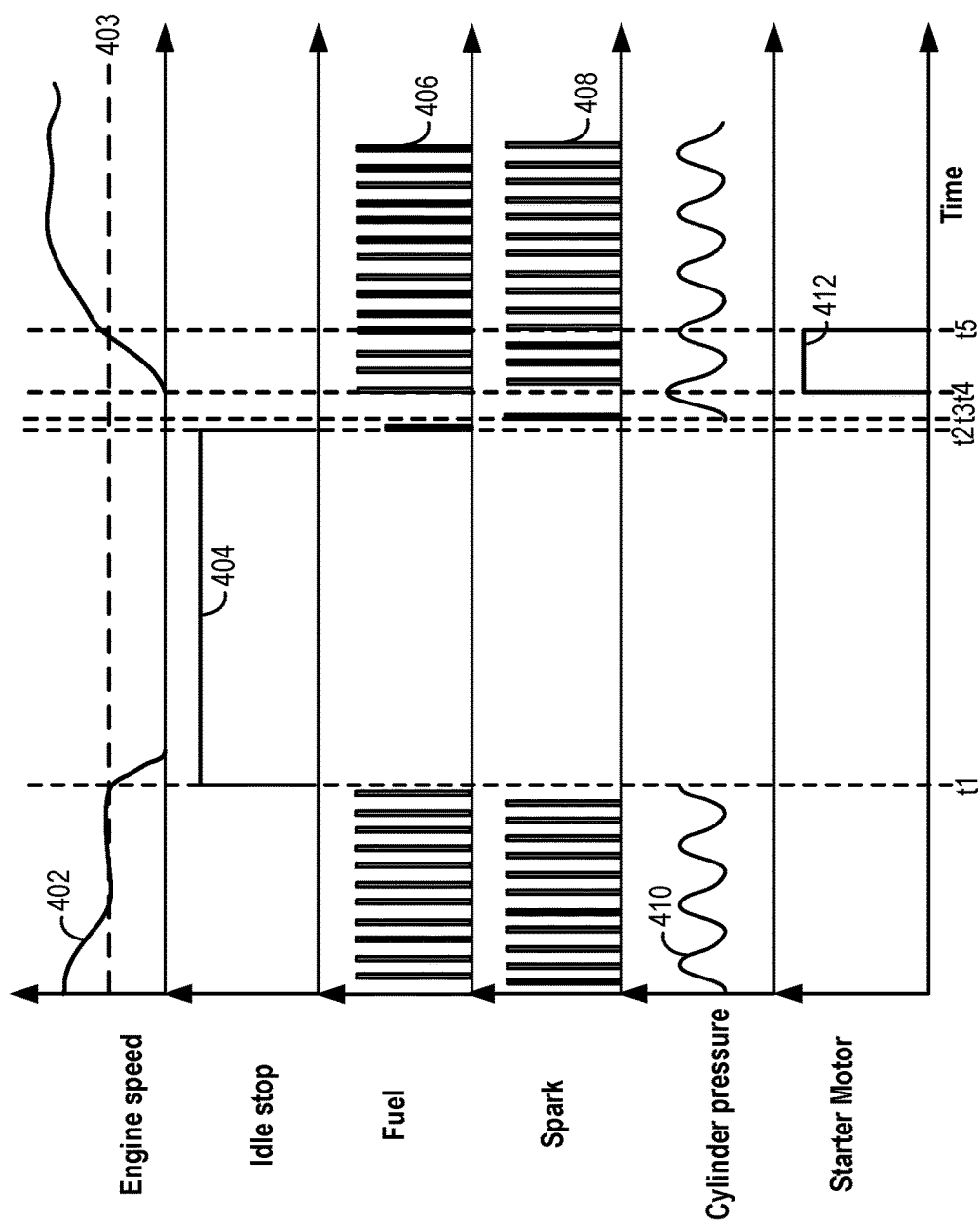
FIG. 4 shows an example of engine idle-start followed by an engine restart.
Figure 5A:
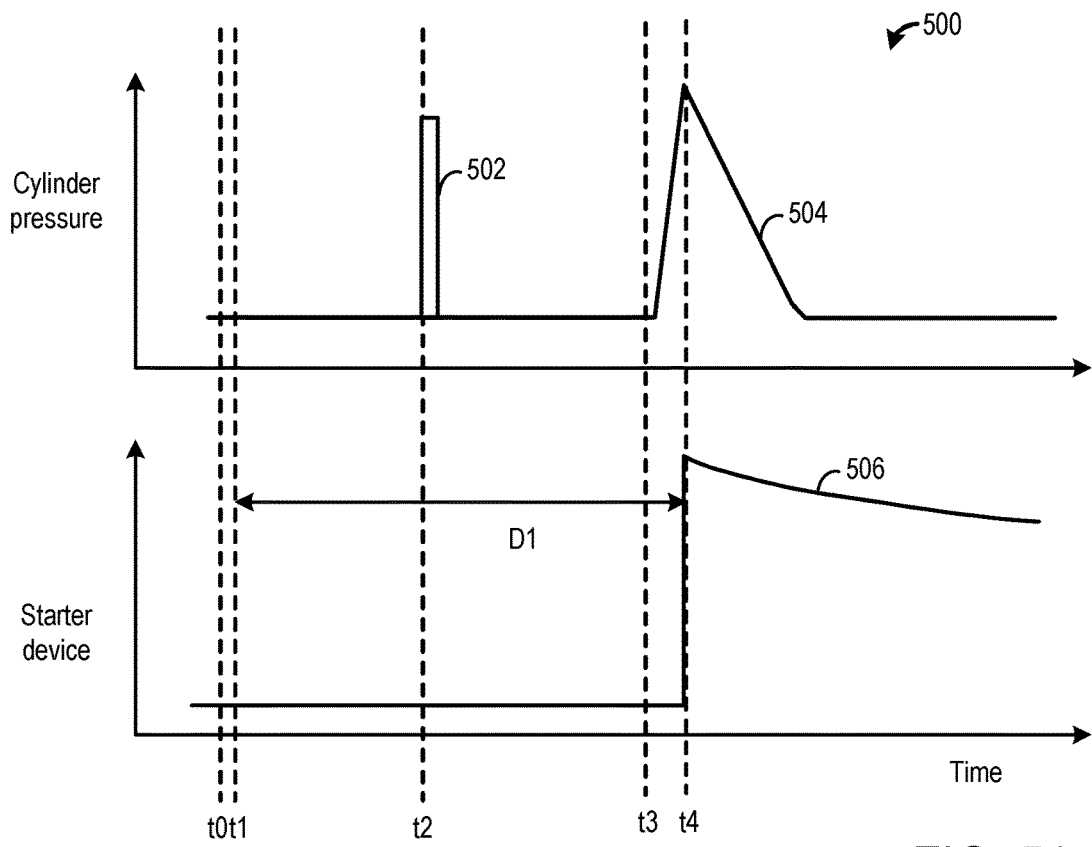
FIG. 5A shows a second example timeline of fuel injection and starter device engagement during the engine restart.

The following description relates to systems and methods for restarting an engine following an engine idle-stop. An example engine system of a hybrid vehicle including a starter device is shown in FIG. 1. An engine controller may be configured to perform a control routine, such as the example routine of FIGS. 2 and 6, to coordinate operation of a starter device and combustion in a selected cylinder during engine restart following an idle-stop. An example of fuel injection and opportunistic starter device engagement during the engine restart is shown in FIGS. 3 and 5A, B. An example timeline of an engine idle-stop followed by a restart is shown in FIG. 4.

FIG. 1 is a schematic diagram showing a vehicle system 100 comprising a vehicle 101 and an engine system 103. FIG. 1 shows one cylinder of a multi-cylinder engine 10 in the engine system 103. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal PP. A combustion chamber (cylinder) 30 of the engine 10 may include combustion chamber walls 32 with a piston 36 positioned therein. Pressure within the combustion chamber 30 may be determined via a cylinder pressure sensor 115 coupled to the combustion chamber 30. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. A position of the crankshaft may be determined via a Hall effect sensor (crankshaft signal sensor) 118 coupled to the crankshaft 40. In one example, the sensor 118, which is also used as an engine speed sensor, may produce a predetermined number of equally spaced pulses every revolution of the crankshaft.

A starter motor 171 may be coupled to crankshaft 40 via flywheel 161 to enable cranking (e.g., spinning the engine via the starter) of engine 10, typically used for starting the engine. The starter motor 171 may be powered via an on-board battery. When starting an engine, after combustion occurs, actuation of the starter is ceased as combustion facilitates spinning of the engine. In one example, starter motor 171 may be a conventional starter motor. In other examples, starter motor 171 may be an integrated starter motor, such as those typically found on hybrid vehicles.

The starter motor may be included in a belt-driven integrated starter generator (BISG) where an electric motor/generator (acting in the motoring mode) provides torque to crank the engine via a belt drive during engine restart conditions. During other conditions, the motor/generator may be operated in the generating mode to charge a system battery using excess engine torque.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 72 and exhaust valve 74. In some embodiments, the combustion chamber 30 may include two or more intake valves and/or two or more exhaust valves.

In this example, the intake valve 72 and exhaust valve 74 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 72 and exhaust valve 74 may be determined by position sensors 75 and 77, respectively. In alternative embodiments, the intake valve 72 and/or exhaust valve 74 may be controlled by electric valve actuation. For example, the combustion chamber 30 may alternatively include an intake valve controlled via electric valve actuation and an exhaust valve controlled via cam actuation including CPS and/or VCT systems.

A fuel injector 66 is shown coupled directly to combustion chamber 30 for injecting fuel directly therein in proportion to the pulse width of signal FPW received from the controller 12 via an electronic driver 68. In this manner, the fuel injector 66 provides what is known as direct injection of fuel into the combustion chamber 30. The fuel injector may be mounted in the side of the combustion chamber or in the top of the combustion chamber (as shown), for example. Fuel may be delivered to the fuel injector 66 by a fuel system (not shown) including a fuel tank, a fuel pump, and a fuel rail. In some embodiments, the combustion chamber 30 may alternatively or additionally include a fuel injector arranged in the intake manifold 44 in a configuration that provides what is known as port injection of fuel into the intake port upstream of the combustion chamber 30.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal TP. The air intake passage 42 may include the intake air temperature (IAT) sensor 125 and the barometric pressure (BP) sensor 128. The IAT sensor 125 estimates intake air temperature to be used in engine operations and provides a signal to the controller 12. Similarly, the BP sensor 128 estimates the ambient pressure for engine operations and provides a signal to the controller 12. The intake passage 42 may further include a mass air flow sensor 120 and a manifold air pressure sensor 122 for providing respective signals MAF and MAP to the controller 12.

An exhaust gas sensor 126 is shown coupled to the exhaust passage 48 upstream of an emission control device 70. The sensor 126 may be any suitable sensor for providing an indication of exhaust gas air/fuel ratio (AFR) such as a linear oxygen sensor or UEGO (universal or wide-range exhaust gas oxygen), a two-state oxygen sensor or EGO, a HEGO (heated EGO), a NOx, HC, or CO sensor.

The emission control device 70 is shown arranged along the exhaust passage 48 downstream of the exhaust gas sensor 126. The device 70 may be a three way catalyst (TWC), NOx trap, various other emission control devices, or combinations thereof. In some embodiments, during operation of the engine 10, the emission control device 70 may be periodically reset by operating at least one cylinder of the engine within a particular air/fuel ratio.

Further, an exhaust gas recirculation (EGR) system 140 may route a desired portion of exhaust gas from the exhaust passage 48 to the intake manifold 44 via an EGR passage 142. The amount of EGR provided to the intake manifold 44 may be varied by the controller 12 via an EGR valve 144. Further, an EGR sensor 146 may be arranged within the EGR passage 142 and may provide an indication of one or more of pressure, temperature, and constituent concentration of the exhaust gas. A linear oxygen sensor 172 may be positioned at the intake passage, downstream of the intake throttle, to facilitate EGR regulation. Under some conditions, the EGR system 140 may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

During conditions when the operator torque demand decreases to below a threshold, such as when the vehicle is stopped at a traffic signal, the engine may idle until the torque demand increases. Prolonged idling may adversely affect fuel economy and emissions quality. In response to engine idle-stop conditions being met, an automatic start-stop operation may be carried out to reduce the duration of engine idling. For example, if it is determined that the engine has been idling for longer than a threshold duration, combustion may be suspended, and engine operation may be stopped (idle-stop). In response to engine idle-start conditions being met, engine may be restarted (idle-start) and combustion may be resumed. Prior to engine restart, a cylinder is selected based on a stop position of the engine and combustion may be initiated in the selected cylinder by injecting fuel to the selected cylinder and then initiating spark in the selected cylinder. The selected cylinder may be one that is stopped in a power stroke with a piston position within the selected cylinder being proximal to a top dead center (TDC) position relative to a cylinder head. An amount of fuel to be injected may be based on one or more of the piston position, an engine temperature, and a barometric pressure. As an example, the amount of fuel injected to the selected cylinder prior to the engine restart is lower than another amount of fuel injected to the selected cylinder after completion of engine cranking via the starter motor 171. A time for attainment of a peak pressure during combustion may be estimated/modeled based on one or more of the piston position, the amount of fuel injected, the engine temperature, and the barometric pressure. Upon estimation of the time for attainment of the peak pressure (which is the time when the highest amount of energy is released from the combustion), the controller may send a command to initiate the starter motor 171 immediately prior to the pressure in the cylinder reaching the peak pressure to synchronize the initiation of the starter motor 171 with the attainment of the peak pressure. Immediately after activating the starter motor 171, combustion in each engine cylinder may also be initiated by injecting fuel and initiating spark in each engine cylinder. The starter motor 171 may be operated until an engine speed increases to a threshold speed, and then the starter motor 171 may be deactivated.

The controller 12 is shown in FIG. 1 as a microcomputer, including a microprocessor unit 102, input/output ports 104, an electronic storage medium for executable programs and calibration values shown as read only memory chip 106 in this particular example, random access memory 108, keep alive memory 110, and a data bus. The controller 12 may receive various signals from sensors coupled to the engine 10, in addition to those signals previously discussed, including measurement of exhaust and intake AFR from oxygen sensors 126 and 172 respectively, inducted mass air flow (MAF) from the mass air flow sensor 120; cylinder pressure (CP) from cylinder pressure sensor 115; engine coolant temperature (ECT) from a temperature sensor 112 coupled to a cooling sleeve 114; engine head temperature (EHT) from a temperature sensor coupled to the cylinder head; a profile ignition pickup signal (PIP) from a Hall effect sensor 118 (or other type) coupled to crankshaft 40; throttle position (TP) from a throttle position sensor; and absolute manifold pressure signal, MAP, from the sensor 122. Engine speed signal, RPM, may be generated by the controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder.

The storage medium read-only memory 106 can be programmed with computer readable data representing non-transitory instructions executable by the processor 102 for performing the methods described below as well as other variants that are anticipated but not specifically listed. As described above, FIG. 1 shows one cylinder of a multi-cylinder engine, and each cylinder may similarly include its own set of intake/exhaust valves, fuel injector, spark plug, etc.

The controller 12 receives signals from the various sensors of FIG. 1 and employs the various actuators of FIG. 1 to adjust engine operation based on the received signals and instructions stored on a memory of the controller 12. In one example, in response to a lower than threshold engine load for a longer than threshold duration, the controller may initiate an engine idle-stop by sending a signal to the fuel injectors 66 to suspend engine cylinder fuel injection. In another example, during engine restart, the controller may send a signal to an actuator of the starter motor 171 to activate the starter motor 171 at a time corresponding to a highest in-cylinder pressure of a cylinder at which combustion is carried out to aid engine restart.

In some examples, vehicle 101 may be a hybrid vehicle with multiple sources of torque available to one or more vehicle wheels 55. In other examples, vehicle 101 is a conventional vehicle with only an engine, or an electric vehicle with only electric machine(s). In the example shown, vehicle 101 includes engine 10 and an electric machine 52. Electric machine 52 may be a motor or a motor/generator. Crankshaft 40 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

In this way, the system of FIG. 1 enables a system for an engine comprising: a controller with computer readable instructions stored on non-transitory memory to: in response to an engine restart request following an engine idle-stop, inject fuel to a cylinder stopped with a piston in a top dead center (TDC) position within the cylinder, initiate spark in the cylinder to start combustion, and activate a starter motor to move the piston at a time of highest energy release from the combustion.

Figure 2:
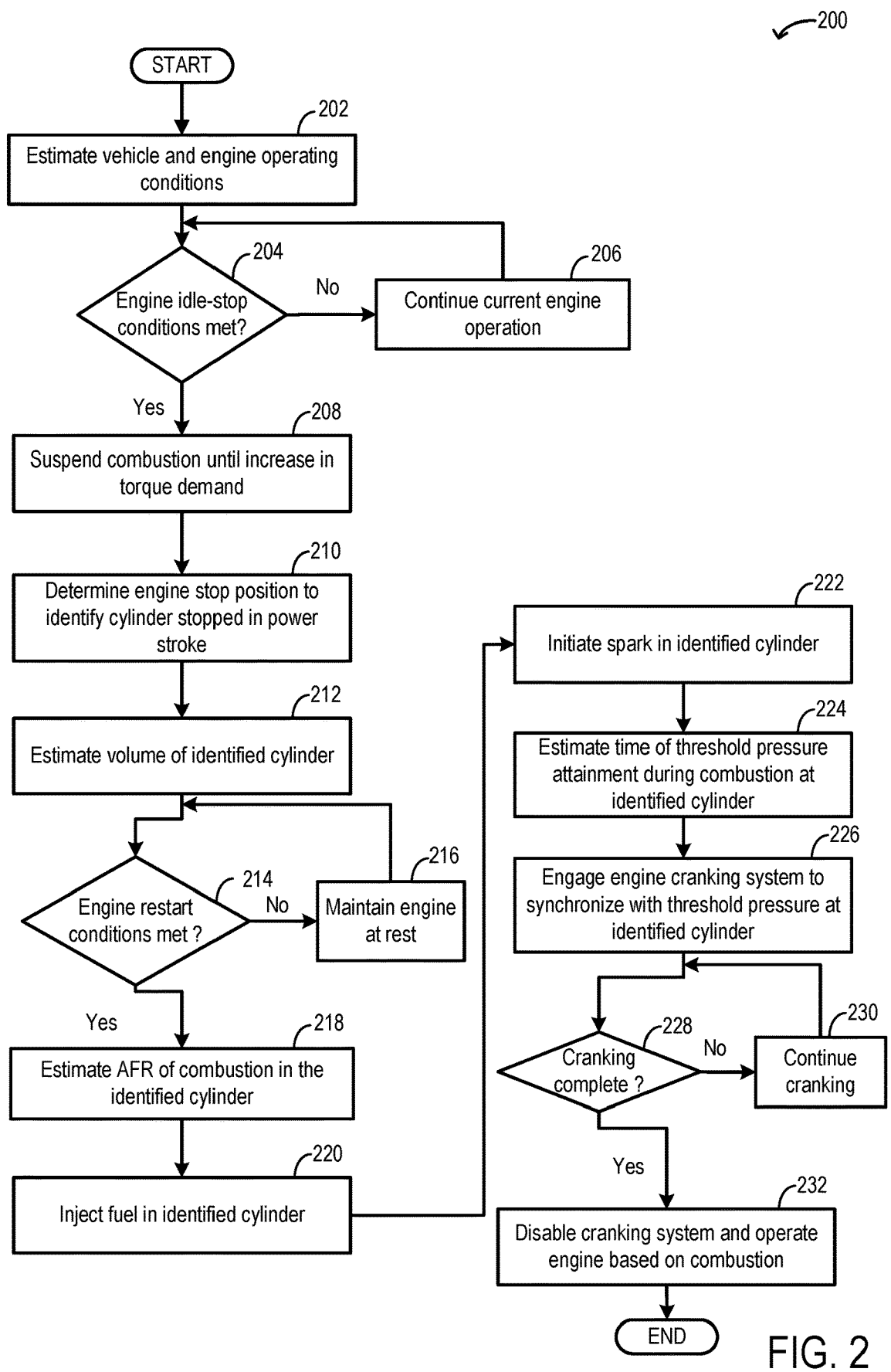
FIG. 2 is a flow chart illustrating an example method that may be implemented for restarting the engine following an engine idle-stop.

FIG. 2 shows an example method 200 for restarting an engine following an engine idle-stop. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, current vehicle and engine operating conditions may be estimated and/or measured. These may include, for example, operator torque demand, engine speed, vehicle speed, engine coolant temperature (ECT), engine head temperature (EHT), engine load, ambient conditions (such as ambient humidity, temperature, and barometric pressure), exhaust temperature, manifold pressure, manifold air flow, battery state of charge, etc.

At 204, the routine includes determining if engine idle-stop conditions are met and if engine spin-down may be initiated. Conditions for engine idle-stop may include engine idling for a longer than threshold duration. For example, engine idling may take place while the vehicle is at a traffic stop when the engine load is below a threshold (such as when the vehicle is stationary). Engine operation at the idling speed for a longer than threshold duration may result in increased fuel usage and increased level of exhaust emissions. Also, the threshold duration may be based on fuel level in the fuel tank. In one example, if the fuel level in the fuel tank is lower than a threshold level, the threshold duration may be decreased such that additional fuel may not be consumed for engine idling.

Engine idle-stop conditions may further include a greater then battery state of charge (SOC). The controller may check battery SOC against a preset minimum threshold and if it is determined that the battery SOC is at least more that 30% charged, automatic engine stop may be enabled. Confirming engine idle-stop conditions may further include an indication that a motor of a starter/generator is operation ready. The status of an air conditioner may be checked and before initiating an engine idle-stop, it may be verified that the air conditioner did not issue a request for restarting the engine, as may be requested if air conditioning is desired. The intake air temperature may be estimated and/or measured to determine if it is within a selected temperature range. In one example, the intake temperature may be estimated via a temperature sensor located in the intake manifold and an engine idle-stop may be initiated when the intake air temperature is above a threshold temperature. Also, the engine temperature may be estimated and/or measured to determine if it is within a selected temperature range. In one example, the engine temperature may be inferred from an engine coolant temperature and an engine idle-stop may be initiated when the engine coolant temperature is above a threshold engine temperature. The driver requested torque may be estimated and confirmation of an engine idle-stop may be initiated in response to a lower than threshold driver requested torque. The vehicle speed may be estimated and assessed whether it is below a predetermined threshold. For example, if the vehicle speed is lower than a threshold (e.g., 3 mph) an engine idle-stop may be requested even if the vehicle is not at rest. Further, an emission control device coupled to the exhaust manifold of engine may be analyzed to determine that no request for engine restart was made.

If it is determined that engine idle-stop conditions are not met, at 206, current engine operations may be continued without initiating the engine start-stop operation such as the engine may be maintained running with cylinders combusting fuel. If it is confirmed that engine idle-stop conditions are met, at 208, combustion may be suspended to idle-stop the engine until there is an increase in torque demand. In order to suspend combustion, fueling to the engine cylinders may be suspended. The controller may send a signal to one or more fuel injectors coupled to the engine cylinders to stop fuel injection to each of the cylinders. Also, the controller may send a signal to the spark plug coupled to each cylinder to disable spark. Once the combustion is suspended, the engine may spin-down and the engine speed may gradually decrease to zero. The engine may be maintained at rest until restart conditions are met.

At 210, an engine stop position may be determined to identify a cylinder stopped in a power (expansion) stroke. When the engine stops spinning, each cylinder may be stopped (parked) at a distinct position. As an example, in a four cylinder engine, a first cylinder may be stopped in the intake stroke, a second cylinder may be stopped at a compression stroke, a third cylinder may be stopped at a power stroke, and a fourth cylinder may be stopped in an exhaust stroke. Based on the stopped position of the engine, the controller may identify a cylinder (such as cylinder A) that is stopped at a power stroke. As an example, cylinder A may be stopped in a position close to or at its top dead center (TDC) position with the piston proximal to the cylinder head. A cylinder stopped at a power stroke is selected since in that position each cylinder valve is closed causing the pressure in the cylinder to be contained and increase when a combustion event occurs in that cylinder.

At 212, the volume of the identified cylinder (cylinder A) may be estimated. The volume of the cylinder may be estimated based on the stopping position of the cylinder such as the relative position of the piston within the bore of the cylinder and cylinder geometry. In one example, the controller may use a look-up table to estimate cylinder volume based on a position of the piston within the cylinder. The piston position may be used as an input to the look-up table and the cylinder volume may be the output.

At 214, the routine includes determining if engine restart conditions are met. In one example, engine restart conditions following an engine idle-stop may include an increase in engine load. In one example, the controller may determine if the brake pedal is released. The accelerator pedal position may also be determined, for example via a pedal position sensor, to determine whether the accelerator pedal has been engaged in addition to the release of the brake pedal. The status of the air conditioner may be checked to verify whether a request has been made to restart, as may be made when air conditioning is desired. The SOC of battery may be estimated to estimate if it is below a predetermined threshold. In one example, it may be desired that battery be at least 30% charged. Accordingly, engine starting may be requested to charge the battery to a desired value.

The engine restart conditions may further include, a request from an emission control device to restart the engine has been made. In one example, the emission control device temperature may be estimated and/or measured by a temperature sensor, and if the temperature is below a predetermined threshold, an engine restart may be requested. The vehicle speed may be estimated and assessed whether it is above the predetermined threshold. For example, if the vehicle speed is greater than a threshold (e.g., 3 mph) an engine start may be requested. It may be determined whether the electrical load of the engine is above a predetermined threshold, in response to which an engine start is requested (e.g., to reduce draining of the battery). In one example, the electrical load may comprise user operated accessory devices, electrically powered air-conditioning, etc.

If it is determined that the engine start conditions have not been met, at 216, engine may be maintained in the stopped condition, and combustion may not be resumed. If it is determined that engine restart conditions are met, at 218, an air fuel ratio (AFR) of an upcoming combustion event in the identified cylinder may be estimated. The AFR may be estimated by the controller as a function of one or more of the piston position in the cylinder, engine temperature (such as engine coolant temperature or engine head temperature), and barometric pressure. The AFR may determine the amount of energy generated from the combustion.

At 220, fuel may be injected to the identified cylinder while fuel injection to other engine cylinders may be remain inactive. The amount of fuel to be selectively injected to the identified cylinder may be estimated based on the determined AFR. The amount of fuel injected may be further based on one or more of the piston position, an engine temperature, and a barometric pressure. As an example, the amount of fuel injected for combustion in the identified cylinder prior to engine cranking may be lower than an amount of fuel injected to the identified cylinder (and other engine cylinders) after engine cranking is completed such as when the engine is operated by combustion. In this way, a lower amount of fuel may be used to facilitate engine start. The controller may send a signal to only an actuator of a fuel injector coupled to the identified cylinder to inject fuel into the identified cylinder when the cylinder is at or near its TDC. The throttle opening may also be adjusted based on the AFR to allow a desired air fuel mixture to enter the identified cylinder.

At 222, after fuel injection, spark may be initiated in the identified cylinder while spark to other engine cylinders may remain inactive. A time delay between fuel injection and spark may be estimated based on a position of a piston in the identified cylinder, the engine temperature, the barometric pressure, and the determined AFR. The controller may send a signal to an actuator of a spark plug coupled to the cylinder to initiate spark. The spark may ignite the air fuel mixture in the identified cylinder and initiate combustion in the identified cylinder while all other engine cylinders remain non-combusting.

At 224, a time of attainment of a threshold pressure in the identified cylinder during combustion may be estimated (such as predicted). In one example, the threshold pressure may be a peak pressure attained in the cylinder during combustion. A time based burn fraction in the cylinder may be estimated by the controller as a function of one or more of the AFR, piston position, engine temperature, and barometric pressure. The time based burn fraction is indicative of the heat release rate from combustion and an amount of time taken during combustion to convert fuel to energy. Based on the estimated time based burn fraction, the controller may estimate a time for attainment of the threshold pressure corresponding to the highest energy release from combustion. Due to combustion, the piston may move downwards while the combustion causes an increase in cylinder pressure. If engine cranking is synchronized with the release in energy, the piston may be simultaneously moved by the two torque sources (combustion within cylinder and starter motor) to efficiently crank the engine.

At 226, the engine cranking system (such as a starter device) may be engaged to synchronize with attainment of the threshold pressure (such as the peak pressure) at the identified cylinder. As an example, based on the estimation of the time of attainment of the threshold pressure in the cylinder, the controller may send a signal (command) to the actuator of the starter device immediately prior to the attainment of the threshold pressure such that the starter device may be activated at the same time as the attainment of threshold cylinder pressure. By commanding the actuation of the starter device slightly ahead of the attainment of threshold pressure, any communication delays in starter device activation due to software or mechanical reasons (such as software delays to command the hardware drivers, the energizing time of a relay/transistor, and time to build a field current in the starter motor) may be accounted for and the actual start of the starter device may correspond to the time of attainment of threshold pressure. In one example, the command to actuate the starter motor may be sent 2-10 seconds prior to the estimated time of attainment of threshold pressure in the identified cylinder. In this way, the starter device may move the piston head at the same time as when the piston is being moved due to combustion in the cylinder. As an example, as elaborated with relation to FIGS. 5A-B, based on the communication delays in starter device activation, the command to the actuator of the starter device may be sent to the starter device prior to fuel injection in the selected cylinder.

Alternatively, the in-cylinder pressure in the identified cylinder may be monitored via a cylinder pressure sensor, and the starter device may be activated upon the pressure sensor output recording the threshold pressure. The starter device may be one of a starter motor, a belt-integrated starter generator (BISG), a P2motor, (P2 being a position of the motor, between the engine and the transmission system), etc. After the starter device is engaged, fueling and spark may be initiated in each engine cylinder to start combustion in all cylinders.

FIG. 3 show a first example timeline 300 of starter device engagement during an engine restart following an engine idle-stop. The horizontal (x-axis) denotes time and the vertical markers t1-t3 identify significant times in the restart process. The vertical (y-axis) denotes pressure in a selected engine cylinder wherein combustion is being carried out prior to engagement of a starter motor during the engine restart. Line 302 shows a change in pressure within the selected cylinder.

Upon conditions being met for an engine restart, at time t1, fuel is injected to the cylinder when the cylinder is close to or at a top dead center (TDC) position. Following the fuel injection, spark is initiated at time t2. The spark ignites the air fuel mixture inside the cylinder causing combustion. As combustion proceeds, energy is released and the pressure within the cylinder increases. At time t3, a peak pressure is reached within the cylinder. In the absence of combustion, since the cylinder is in the power stroke, the peak pressure in the cylinder may have gradually decreased as shown by dashed line 304.

The starter motor is also engaged at time t3 such that piston motion caused by combustion and piston motion by the starter motor is coordinated. By coordinating two separate torque sources, engine start efficiency may be improved.

In one example, the time of engagement of the starter device may be estimated based on a communication delay between the starter device and the engine controller. The communications delay may vary based on the system such as the starter device used and the communications network connecting the actuator of the starter device to the controller. The communications delay may be pre-calibrated for each system and the time of engagement of the starter device may be estimated based on the pre-calibrated communications delay as retrieved from the controller memory. The fuel injection timing may also be adjusted based on the communications delay for starter motor engagement.

FIG. 5A shows a second example timeline 500 of fuel injection and starter device engagement during the engine restart following an engine idle-stop. The horizontal (x-axis) denotes time and the vertical markers t0-t4 identify significant times in the restart process. The first plot, line 504, denotes pressure in a selected engine cylinder wherein combustion is being carried out prior to engagement of a starter motor during the engine restart. The second plot, line 506, denotes operation of a starter device.

Upon conditions being met for an engine restart, at time t0, the controller may determine the communications delay for the starter device. As an example, the controller may retrieve the pre-calibrated value of the communications delay (in seconds) between the time when the controller sends a command to the actuator coupled to the starter device and the actual initiation of the starter device. Based on the communications delay, the controller may determine the time of fuel injection and the time of sending the command to the actuator coupled to the starter device relative to the time t0 at which engine restart conditions are met.

In this example, at t0, the controller determines that the communication delay for the starter device actuation is D1 and at time t1 the controller sends a command to the actuator coupled to the starter device to activate the starter device. After the command has been sent to the starter device, at time t2, fuel is injected to the cylinder when the cylinder that is stopped in a power stroke. Following the fuel injection, spark is initiated at time t3. The spark ignites the air fuel mixture inside the cylinder causing combustion. As combustion proceeds, energy is released and the pressure within the cylinder increases. At time t4, a peak pressure is reached within the cylinder.

The command that was sent to the starter device actuator, causes the starter device to be initiated at time t4 such that piston motion caused by combustion and piston motion by the starter motor is coordinated. By coordinating two separate torque sources, engine start efficiency may be improved. In another embodiment, the actual time of initiation of the starter motor may be after the attainment of peak pressure, such as after time t4.

Figure 5B:
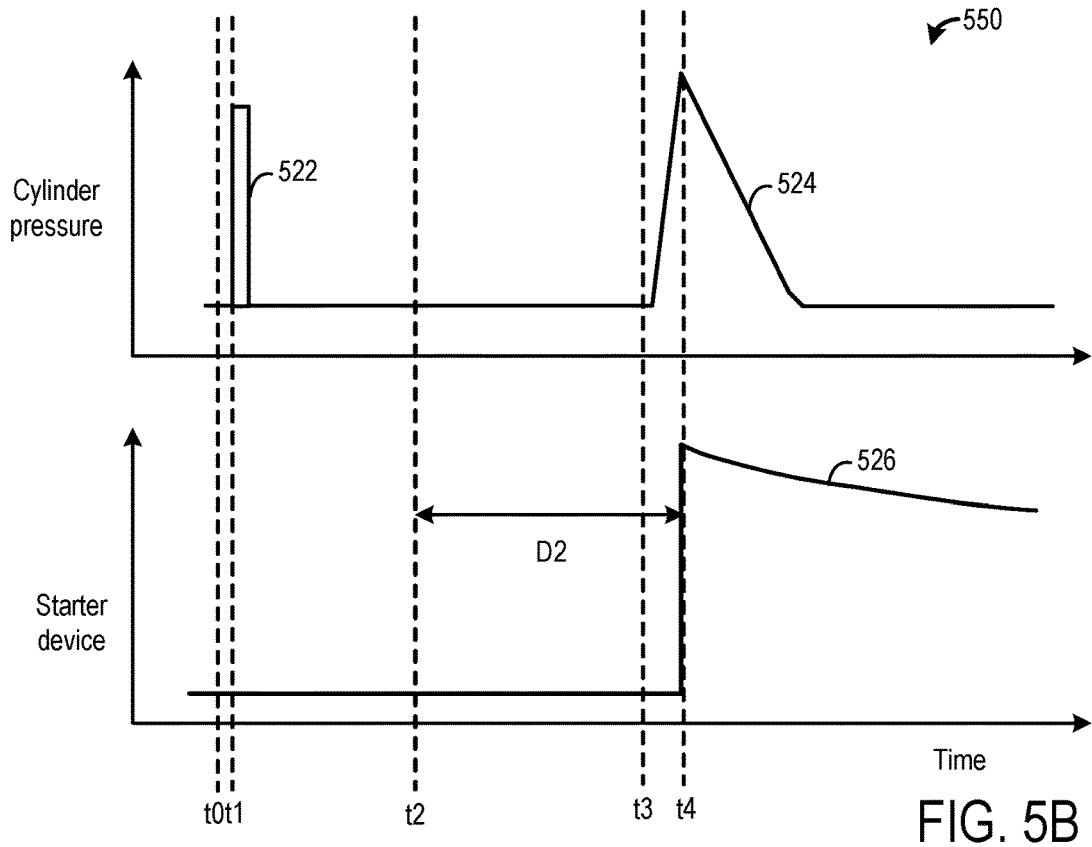
FIG. 5B shows a third example timeline of fuel injection and starter device engagement during the engine restart.

FIG. 5B shows a third example timeline 550 of fuel injection and starter device engagement during the engine restart following an engine idle-stop. The horizontal (x-axis) denotes time and the vertical markers t0-t4 identify significant times in the restart process. The first plot, line 524, denotes pressure in a selected engine cylinder wherein combustion is being carried out prior to engagement of a starter motor during the engine restart. The second plot, line 526, denotes operation of a starter device.

Upon conditions being met for an engine restart, at time t0, the controller may determine the communications delay for the starter device. As an example, the controller may retrieve the pre-calibrated value of the communications delay (in seconds) between the time when the controller sends a command to the actuator coupled to the starter device and the actual initiation of the starter device.

In this example, at t0, the controller determines that the communication delay for the starter device actuation is D2 (D2 is less than D1 of example 500) and at time t1, prior to sending a command to actuate the starter device, fuel is injected to the cylinder when the cylinder that is stopped in a power stroke. Following the fuel injection, at time t2 the controller sends a command to the actuator coupled to the starter device to activate the starter device. After the command has been sent to the starter device, spark is initiated at time t3. The spark ignites the air fuel mixture inside the cylinder causing combustion. As combustion proceeds, energy is released and the pressure within the cylinder increases. At time t4, a peak pressure is reached within the cylinder.

The command that was sent to the starter device actuator, causes the starter device to be initiated at time t4 such that piston motion caused by combustion and piston motion by the starter motor is coordinated. In another embodiment, the actual time of initiation of the starter motor may be after the attainment of peak pressure, such as after time t4. In this way, based on the communications delay of the starter device, fuel injection timing may be adjusted and fuel may be injected prior to or after the command is sent to the starter device actuator to engage the starter device.

Returning to FIG. 2, at 228, the routine includes determining if the cranking is complete. Cranking may be completed when the engine speed reaches a threshold speed. In one example, the threshold speed may be an engine idling speed. If it is determined that cranking has not been completed, at 230, engine cranking may be continued by operating the starter device along with combustion in the engine cylinders.

If it is determined that cranking is completed, at 232, the cranking system (starter device) may be disabled, and the engine may be operated based on combustion. The controller may send a signal to the actuator of the starter device to disable the starter device.

In this way, during an engine idle-stop, in response to an increase in engine torque demand, a cylinder parked in a power stroke may be identified, combustion may be initiated in the identified cylinder, a time of peak pressure attainment in the identified cylinder may be predicted, and a starter motor may be activated to coordinate cranking of the engine with the time of peak pressure attainment.

Figure 6:
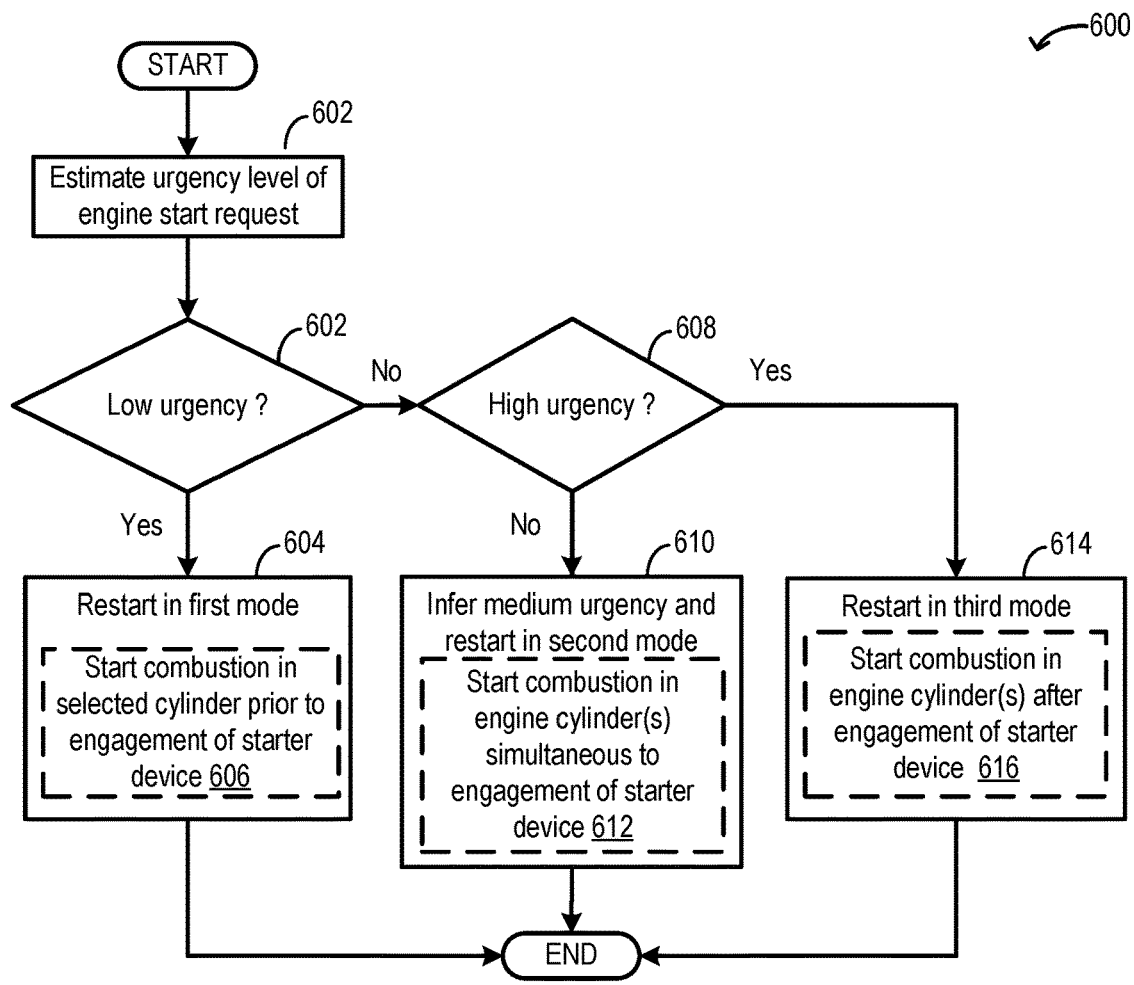
FIG. 6 is a flow chart illustrating an example method that may be implemented to select a mode of engine restart following an idle-stop to provide the driver demand torque while meeting an engine starting urgency level.

FIG. 6 shows an example method 600 for selecting a mode of engine restart following an engine idle-stop. A mode of engine restart may include an order of initiation of combustion and engagement of the starter device to crank the engine in response to one or more conditions for engine restart being met. The engine may be automatically started in a mode selected according to an urgency level for the engine start that is determined from vehicle operating conditions. For low urgency engine starts, the engine may be started such that the energy to start the engine may be reduced as compared to engine starts that are determined to be of medium or high urgency. For high urgency engine starts, maximum torque capacity of the electric machine and of the engine may be requested so that driver demand torque may be met in a timely manner. The vehicle system includes where the plurality of start urgency levels include a high urgency, a medium urgency, and a low urgency. The method 600 may be carried out in response to conditions for an engine restart (as elaborated in step 214 in FIG. 2) following an engine idle-stop being met.

At 601, an urgency level of the engine start request may be estimated. An urgency of an engine start may be estimated based on a function of driver torque demand with the level of urgency increasing (from low urgency to medium urgency and then to high urgency) with an increase in driver torque demand. As one example, an engine start urgency is estimated to be a high level based on the engine start being requested in response to the driver demand exceeding a threshold such as based on an accelerator pedal tip-in (high accelerator pedal position). The urgency may also be estimated to be high if it is determined that the starter device has insufficient torque to start the engine and provide the requested driver demand torque at a predetermined time in the future (e.g., 0.5 seconds after the engine restart request). As another example, if a system component such as an on-board climate control system is the originator of the signal that is the basis for the engine start request, then the engine start urgency may be determined to be lower urgency. Nevertheless, some vehicle devices that are the basis for the engine start request may be the basis for adjusting engine starting urgency to a medium level. For example, an engine exhaust system temperature monitor that is the basis for an engine start request may be deemed to warrant a low engine start urgency level. Conversely, a significant change in battery state of charge in a short time period may be deemed to warrant a medium engine start urgency level. As another example, if the originator of a signal that is a basis for the engine start request is a human operator with the driver demand not exceeding the threshold, then the engine start urgency is deemed to be medium urgency. Engine start urgency levels according to the originator of the engine start request as well as rates of change of vehicle operating parameters (e.g., battery state of charge).

At 602, the routine includes determining if a low urgency level has been estimated for the engine start.

If it is determined that the engine start following an engine idle-stop is of low urgency, at 604, the engine may be restarted in a first mode. Restarting in the first mode may include, at 606, starting combustion in a selected engine cylinder prior to engagement of the starter motor. The selected cylinder may be selected based on a stop position of the engine, the selected cylinder stopped in a power stroke with each of an intake valve, and an exhaust valve coupled to the cylinder in a closed position. Combustion includes injecting fuel to the selected cylinder via one or more fuel injectors coupled to the cylinder and igniting the fuel via spark. Upon attainment of a threshold combustion pressure in the selected cylinder, the starter device may be engaged. Engine restart in the first mode is elaborated with reference to FIGS. 2, 3, and 5A-B. By carrying out expansion combustion prior to engine cranking via a starter device, the peak current in the starter device may be reduced, peak torque on a pinion interface may be reduced thereby reducing the torque requirements of the starter device. Maximum torque assistance from combustion may be utilized and engine restart may be improved while reducing wear of the starter device. Engine cranking via the starter device may be continued until the engine speed reaches a threshold speed, such as the engine idling speed and then the starter motor may be deactivated and the engine may be rotated solely via combustion.

If it is determined that the urgency level of the engine restart request is not low, the routine includes determining, at 608, if the urgency level of the engine restart is high. If it is determined that the urgency level of the engine start is not high or low, at 610, it may be inferred that the urgency level of the engine restart request is medium. In response to an engine start request of medium urgency, the engine may be restarted in the second mode. Restarting the engine in the second mode may include at 612, start combustion in one or more engine cylinders simultaneous to the engagement of the starter device. After fuel injection, spark timing may be adjusted such that combustion and engine cranking via the starter device may occur simultaneously. Engine cranking via the starter device may be continued until the engine speed reaches a threshold speed, such as the engine idling speed. In this mode, some assistance may be provided to the starter motor for engine cranking while facilitating engine start.

If at 608 it is determined that the urgency level of the engine start is high, at 614, the engine may be restarted in the third mode. Restarting the engine in the third mode may include, at 616, starting combustion in one or more engine cylinders after engagement of the starter device. The starter device may first be engaged to crank the engine and then after the engine is cranked for a threshold duration, fueling and speak may be initiated in the engine cylinders to start combustion. By initiating engine cranking solely via the starter device, engine start may be expedited. A higher peak current of the starter motor may be used to crank the engine without support from torque generated from combustion and a higher static friction is to be overcome.

FIG. 4 shows an example operating sequence 400 illustrating an engine idle-stop and subsequent restart. The horizontal (x-axis) denotes time and the vertical markers t1-t5 identify significant times in engine operation.

The first plot, line 402, shows engine speed as estimated via a crankshaft position sensor. Dashed line 403 denotes engine idling speed above which the engine may no longer be cranked via operation of a starter motor. The second plot, line 404, denotes a duration when the engine is idle-stopped without combustion. The third plot, line 406, denotes fuel injection to a first, selected cylinder. The first cylinder is selected on the basis of a stopping position of the engine at idle-stop, the first cylinder stopped in an expansion position. The fourth plot, line 408, denotes spark in the selected cylinder. The fifth plot, line 410, denotes pressure within the first cylinder as estimated or modeled based on inputs from a cylinder pressure sensor. The sixth plot, line 412, denotes operation of a starter motor to crank an engine from rest.

Prior to time t1, the engine is operated and the vehicle is propelled via engine torque. Fuel is injected to the first cylinder and the air fuel mixture within the cylinder is ignited by spark following the fuel injection. The pressure in the cylinder varies based on the cylinder stroke. The in-cylinder pressure reaches a peak when a highest amount of energy is released during combustion such as in the power stroke. Since the engine is driven by combustion, the starter motor is maintained in an inactive condition and is not used for engine cranking.

At time t1, in response to a longer than threshold duration of engine operating at its idling speed (condition met for initiating an idle-stop), the engine is idle-stopped. The controller sends a signal to the respective fuel injectors and spark plugs coupled to each engine cylinder to suspend fueling and spark. Between time t1 and t2, the engine is idle-stopped with combustion in the engine cylinders.

At time t2, in response to an increased torque request (condition met for engine restart), fuel is injected to a cylinder (first cylinder) that has been stopped in the power stroke. The amount of fuel injected is determined based on a position of the piston within the cylinder, engine temperature, and barometric pressure. The amount of fuel injected is lower than an amount of fuel injected during subsequent engine operation after cranking. Following the fuel injection, at time t3, spark is initiated to ignite the air fuel mixture in the cylinder. Once combustion starts, the in-cylinder pressure increases and a time of attainment of the peak cylinder pressure is modeled based on the amount of fuel injected, piston position, engine temperature, and barometric pressure. Based on the model, it is predicted that the peak cylinder pressure will be reached at time t4.

At time t4, the starter motor is activated to synchronize initiation of engine cranking with the peak cylinder pressure. As the peak pressure is attained, the piston moves and is pushed down. The simultaneous movement of the piston due to combustion and cranking expedite engine rotation. Also at time t4, fuel and spark is initiated at all engine cylinders as the engine is being cranked via the starter motor. At time t5, in response to the engine speed increasing to its threshold speed (idling speed) 403, the starter motor is deactivated.

In this way, by coordinating a peak cylinder pressure during combustion in a selected cylinder and engine cranking via a starter device, engine start may be expedited. By selecting a cylinder stopped at an expansion position, combustion may be efficiently carried out in the cylinder to leveraging torque generated from the combustion to move the piston during engine cranking. Overall, by using two torque sources to restart an engine, restart efficiency may be improved and degradation of the starter device may be hindered.

In this way, by synchronizing highest energy release from combustion carried out in one cylinder and engagement of a starter device, maximum torque assistance from combustion may be utilized. By coordinating multiple torque sources, efficiency of an engine start may be improved. By sending the command for activating the starter device immediately before peak pressure is attained, piston movement via the starter device and due to combustion may be synchronized. The technical effect of carrying our combustion in one selected cylinder immediately before engine cranking is that work done by the starter device to crank an engine may be decreased, thereby decreasing wear in the starter device hardware. Overall, by improving efficiency of an engine start event, emissions quality, operator satisfaction, and hardware health may be improved.

In one example, a method for an engine, comprises: prior to a first engine restart following an idle-stop, initiating combustion in a selected cylinder, and at a threshold pressure in the selected cylinder, engaging a starter device to crank the engine. In the preceding example, additionally or optionally, the selected cylinder is selected based on a stop position of the engine, the selected cylinder stopped in a power stroke with each of an intake valve and an exhaust valve coupled to the cylinder in a closed position and wherein the combustion is initiated prior to the cranking the engine. In any or all of the preceding examples, additionally or optionally, initiating combustion includes injecting fuel to the selected cylinder and then initiating spark in the selected cylinder, the method further comprising, estimating an amount of fuel injected based on one or more of a piston position, an engine temperature, and a barometric pressure. In any or all of the preceding examples, additionally or optionally, the method further comprising, predicting a time for attainment of the threshold pressure based on one or more of the piston position, the amount of fuel injected, spark timing, a time of injecting the fuel to the selected cylinder, the engine temperature, and the barometric pressure. In any or all of the preceding examples, the method further comprising, additionally or optionally, sending a command to initiate the starter device a threshold duration prior to a pressure in the cylinder reaching the threshold pressure to synchronize the initiation of the starter device with the attainment of the threshold pressure, the threshold duration based on a communications delay between sending the command and initiation of the starter device. In any or all of the preceding examples, additionally or optionally, the time of injecting the fuel to the selected cylinder is based on the communications delay, the fuel being injected before or after sending the command to initiate the starter device. In any or all of the preceding examples, additionally or optionally, the time of injecting the fuel to the selected cylinder is based on the communications delay, the fuel being injected before or after sending the command to initiate the starter device. In any or all of the preceding examples, additionally or optionally, the threshold pressure is equal to or lower than a peak combustion pressure attained in the selected cylinder during the combustion, the method further comprising, estimating the time for attainment of the threshold pressure based on an input of a cylinder pressure sensor coupled to the selected cylinder. In any or all of the preceding examples, additionally or optionally, during the first engine restart, the combustion is initiated prior to the engagement of the starter device. In any or all of the preceding examples, the method further comprising, additionally or optionally, in a second restart different from the first engine restart, initiating combustion simultaneous to the engagement of the starter device, and in a third restart different from each of the second restart and the first engine restart, initiating combustion after the engagement of the starter device. Any or all of the preceding examples, further comprising, additionally or optionally, selecting one of the first engine restart, the second engine restart, and the third engine restart based on an urgency level of engine restart, the urgency level estimated as a function of driver torque demand. In any or all of the preceding examples, additionally or optionally, the starter device is one of a starter motor, a belt-integrated starter generator (BISG), and a P2 motor.

Another example method for an engine comprises: during an engine idle-stop, in response to an increase in engine torque demand, identifying a cylinder parked in a power stroke, initiating combustion in the identified cylinder, predicting a time of attainment of a threshold pressure in the identified cylinder, and engaging a starter motor to coordinate cranking of the engine with the time of attainment of the threshold pressure. In the preceding example, additionally or optionally, initiating combustion includes injecting fuel to the identified cylinder and then initiating spark. In any or all of the preceding examples, the method further comprising, additionally or optionally, estimating an air fuel ratio of the combustion in the identified cylinder based on one or more of a position of a piston in the identified cylinder, an engine temperature, and a barometric pressure, and adjusting an amount of fuel injected to the identified cylinder based on the estimated air fuel ratio. In any or all of the preceding examples, the method further comprising, additionally or optionally, estimating a time delay between fuel injection and spark dependent on the position of the piston in the identified cylinder, the engine temperature, the barometric pressure, and the estimated air fuel ratio. In any or all of the preceding examples, additionally or optionally, the prediction of the time of attainment of the threshold pressure is based on at least one of the position of the piston, the amount of fuel injected, the engine temperature, and the barometric pressure. In any or all of the preceding examples, additionally or optionally, the starter motor is activated by sending a command to an actuator of the starter motor before the predicted time of attainment of the threshold pressure to activate the starter motor at the time of attainment of the threshold pressure, a time of sending the command based on a communications delay between the time of sending the command and activation of the starter device.

In yet another example, a system for an engine, comprises: a controller with computer readable instructions stored on non-transitory memory to: in response to an engine restart request following an engine idle-stop, inject fuel to a cylinder stopped with a piston in a top dead center (TDC) position within the cylinder, initiate spark in the cylinder to start combustion, and activate a starter motor to crank the engine in coordination with pressure from the combustion. In the preceding example, additionally or optionally, the pressure from the combustion is estimated as a function of engine temperature, barometric pressure, and an amount of fuel injected to the cylinder. In any or all of the preceding examples, additionally or optionally, a command to activate the starter motor is transmitted to the starter motor prior to the time of attainment of a highest pressure from combustion.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
prior to a first engine restart following an idle-stop, initiating combustion in a selected cylinder, and at a threshold pressure in the selected cylinder, engaging a starter device to crank the engine; and
wherein the selected cylinder is selected based on a stop position of the engine, the selected cylinder stopped in a power stroke with each of an intake valve and an exhaust valve coupled to the cylinder in a closed position and wherein the combustion is initiated prior to the cranking of the engine.

2. The method of claim 1, wherein initiating combustion includes injecting fuel to the selected cylinder and then initiating spark in the selected cylinder, the method further comprising, estimating an amount of fuel injected based on one or more of a piston position, an engine temperature, and a barometric pressure.

3. The method of claim 2, further comprising, predicting a time for attainment of the threshold pressure based on one or more of the piston position, the amount of fuel injected, spark timing, a time of injecting the fuel to the selected cylinder, the engine temperature, and the barometric pressure.

4. The method of claim 3, further comprising, sending a command to initiate the starter device a threshold duration prior to a pressure in the cylinder reaching the threshold pressure to synchronize the initiation of the starter device with the attainment of the threshold pressure, the threshold duration based on a communications delay between sending the command and initiation of the starter device.

5. The method of claim 4, wherein the time of injecting the fuel to the selected cylinder is based on the communications delay, the fuel being injected before or after sending the command to initiate the starter device.

6. The method of claim 1, wherein the threshold pressure is equal to or lower than a peak combustion pressure attained in the selected cylinder during the combustion, the method further comprising, estimating the time for attainment of the threshold pressure based on an input of a cylinder pressure sensor coupled to the selected cylinder.

7. The method of claim 1, wherein during the first engine restart, the combustion is initiated prior to the engagement of the starter device.

8. The method of claim 2, further comprising, in a second restart different from the first engine restart, initiating combustion simultaneous to the engagement of the starter device, and in a third restart different from each of the second restart and the first engine restart, initiating combustion after the engagement of the starter device.

9. The method in claim 8, further comprising, selecting one of the first engine restart, the second engine restart, and the third engine restart based on an urgency level of engine restart, the urgency level estimated as a function of driver torque demand.

10. The method of claim 1, wherein the starter device is one of a starter motor, a belt-integrated starter generator (BISG), and a P2 motor.

11. A method for an engine, comprising:
during an engine idle-stop, in response to an increase in engine torque demand,
identifying a cylinder parked in a power stroke;
initiating combustion in the identified cylinder;
predicting a time of attainment of a threshold pressure in the identified cylinder; and
engaging a starter motor to coordinate cranking of the engine with the time of attainment of the threshold pressure.

12. The method of claim 11, wherein initiating combustion includes injecting fuel to the identified cylinder and then initiating spark.

13. The method of claim 11, further comprising, estimating an air fuel ratio of the combustion in the identified cylinder based on one or more of a position of a piston in the identified cylinder, an engine temperature, and a barometric pressure, and adjusting an amount of fuel injected to the identified cylinder based on the estimated air fuel ratio.

14. The method of claim 13, further comprising, estimating a time delay between fuel injection and spark dependent on the position of the piston in the identified cylinder, the engine temperature, the barometric pressure, and the estimated air fuel ratio.

15. The method of claim 13, wherein the prediction of the time of attainment of the threshold pressure is based on at least one of the position of the piston, the amount of fuel injected, the engine temperature, and the barometric pressure.

16. The method of claim 11, wherein the starter motor is activated by sending a command to an actuator of the starter motor before the predicted time of attainment of the threshold pressure to activate the starter motor at the time of attainment of the threshold pressure, a time of sending the command based on a communications delay between the time of sending the command and activation of the starter device.

17. A system for an engine, comprising:
a controller with computer readable instructions stored on non-transitory memory to:
in response to an engine restart request following an engine idle-stop,
inject fuel to a cylinder stopped with a piston in a top dead center (TDC) position of a power stroke within the cylinder;
initiate spark in the cylinder to start combustion; and
activate a starter motor to crank the engine in coordination with pressure from the combustion.

18. The system of claim 17, wherein the pressure from the combustion is estimated as a function of engine temperature, barometric pressure, and an amount of fuel injected to the cylinder.

19. The system of claim 17, wherein a command to activate the starter motor is transmitted to the starter motor prior to the time of attainment of a highest pressure from combustion.

* * * * *